(12) United States Patent
Faeldan

(10) Patent No.: US 7,617,661 B2
(45) Date of Patent: Nov. 17, 2009

(54) TRI-WHEELED MODULAR HOUSING TELESCOPIC GRASS TRIMMER

(75) Inventor: Harry Teruel Faeldan, San Diego, CA (US)

(73) Assignees: Aida Golez Faeldan, Dover, PA (US); Daisy Lynn Faeldan Farrales, San Diego, CA (US); Tricia Faeldan Suarez, Moreno Valley, CA (US); Liza Golez Faeldan, San Diego, CA (US); Alan Golez Faeldan, San Diego, CA (US)

( * ) Notice: Subject to any disclaimer, the term of this patent is extended or adjusted under 35 U.S.C. 154(b) by 0 days.

(21) Appl. No.: 11/818,161

(22) Filed: Jun. 13, 2007

(65) Prior Publication Data

US 2008/0072557 A1 Mar. 27, 2008

Related U.S. Application Data

(60) Provisional application No. 60/816,042, filed on Jun. 22, 2006.

(51) Int. Cl.
*A01D 34/00* (2006.01)
(52) U.S. Cl. ..................................................... 56/12.7
(58) Field of Classification Search ................. 56/12.7, 56/17.2, 17.1, DIG. 12, 17.5; 30/376, 122; 172/14; D15/14, 17
See application file for complete search history.

(56) References Cited

U.S. PATENT DOCUMENTS

| 498,533 | A | | 5/1893 | Clousing |
|---|---|---|---|---|
| 1,467,212 | A | | 9/1923 | Walsh |
| 2,608,043 | A | | 8/1952 | Berdan |
| 2,719,397 | A | | 10/1955 | Pritchard |
| 2,739,437 | A | | 3/1956 | True |
| 2,778,233 | A | | 1/1957 | Perry |
| 4,033,098 | A | | 7/1977 | Green |
| 4,043,101 | A | | 8/1977 | Lahr |
| 4,077,191 | A | | 3/1978 | Pittinger, Sr. |
| 4,182,100 | A | * | 1/1980 | Letter .......................... 56/16.7 |
| 4,224,784 | A | * | 9/1980 | Hansen et al. ............... 56/16.9 |
| 4,341,060 | A | | 7/1982 | Lowry |
| 4,343,139 | A | | 8/1982 | Lowry |
| 4,351,143 | A | | 9/1982 | Lessig |
| 4,389,836 | A | | 6/1983 | Lowry |
| 4,411,126 | A | | 10/1983 | Lowry |
| 4,442,659 | A | * | 4/1984 | Enbusk ........................ 56/12.7 |
| 4,512,143 | A | | 4/1985 | Jimenez |
| 4,531,350 | A | * | 7/1985 | Huthmacher ................. 56/17.5 |
| 4,587,800 | A | | 5/1986 | Jimenez |
| 4,688,376 | A | * | 8/1987 | Wolfe, Sr. .................... 56/16.7 |
| 4,704,849 | A | * | 11/1987 | Gilbert et al. ................ 56/17.5 |
| 4,756,147 | A | | 7/1988 | Savell |
| 4,818,135 | A | | 4/1989 | Desjardins |
| 4,829,755 | A | * | 5/1989 | Nance .......................... 56/17.1 |

(Continued)

*Primary Examiner*—Árpád Fábián-Kovács
(74) *Attorney, Agent, or Firm*—Mastermind IP Law P.C.

(57) ABSTRACT

The present invention relates to a grass trimmer comprising a wheeled carriage, a motorized cutting element situated in a housing unit fitted to said carriage, and an integrated hand lever, the improvements comprising the cutting element being situated between front and rear wheels so as to render it unobstructed on each side, and the integrated hand lever being connected to the front wheel via a telescopic shaft so as to maintain the cutting element relatively parallel to the underside of the carriage as it is raised and lowered via adjustment to the telescopic shaft.

17 Claims, 3 Drawing Sheets

U.S. PATENT DOCUMENTS

| | | | | |
|---|---|---|---|---|
| 4,845,929 | A | 7/1989 | Kawasaki | |
| 4,873,819 | A | 10/1989 | Shivers | |
| 4,879,869 | A | 11/1989 | Buckendorf, Jr. | |
| 4,891,931 | A | 1/1990 | Holland | |
| 4,922,694 | A * | 5/1990 | Emoto | 56/16.7 |
| 4,936,886 | A | 6/1990 | Quillen | |
| 5,048,276 | A | 9/1991 | Miller | |
| 5,048,615 | A | 9/1991 | Feldmann | |
| 5,092,112 | A * | 3/1992 | Buckendorf, Jr. | 56/17.5 |
| 5,095,687 | A * | 3/1992 | Andrew et al. | 56/12.7 |
| 5,222,750 | A * | 6/1993 | Ellis | 280/47.33 |
| 5,279,102 | A * | 1/1994 | Foster | 56/12.7 |
| 5,287,683 | A * | 2/1994 | Smith | 56/12.7 |
| 5,313,770 | A | 5/1994 | Smothers | |
| 5,317,807 | A | 6/1994 | Pulley | |
| D357,690 | S * | 4/1995 | Gobel | D15/14 |
| 5,408,816 | A * | 4/1995 | Cartier | 56/17.5 |
| 5,450,715 | A * | 9/1995 | Murray | 56/16.9 |
| 5,459,985 | A | 10/1995 | Gedert | |
| 5,477,665 | A | 12/1995 | Stout | |
| 5,484,154 | A | 1/1996 | Ward | |
| 5,561,969 | A | 10/1996 | Sandy | |
| 5,594,990 | A * | 1/1997 | Brant et al. | 30/122 |
| 5,603,205 | A * | 2/1997 | Foster | 56/16.7 |
| 5,613,354 | A * | 3/1997 | Foster | 56/16.7 |
| 5,626,006 | A * | 5/1997 | Fricke, Sr. | 56/12.7 |
| 5,657,783 | A | 8/1997 | Sisko et al. | |
| D398,615 | S * | 9/1998 | Rappolt | D15/17 |
| D398,817 | S * | 9/1998 | Meisner et al. | D8/8 |
| 5,809,653 | A | 9/1998 | Everts et al. | |
| 5,829,236 | A * | 11/1998 | Ballard et al. | 56/16.7 |
| 5,836,142 | A * | 11/1998 | Maxwell | 56/12.1 |
| D402,297 | S | 12/1998 | Rappolt | |
| D402,433 | S | 12/1998 | Well | |
| 5,850,728 | A * | 12/1998 | Rappolt | 56/17.1 |
| 5,884,462 | A * | 3/1999 | Gerber | 56/12.1 |
| 5,970,692 | A * | 10/1999 | Foster | 56/12.1 |
| 5,970,694 | A * | 10/1999 | Knox, Jr. | 56/16.7 |
| 6,009,694 | A * | 1/2000 | Moore et al. | 56/12.7 |
| 6,050,069 | A * | 4/2000 | Elensky | 56/7 |
| 6,056,067 | A | 5/2000 | Brown | |
| 6,065,275 | A * | 5/2000 | Pope | 56/12.7 |
| 6,085,503 | A * | 7/2000 | Hutchinson | 56/12.7 |
| 6,363,699 | B1 | 4/2002 | Wang | |
| 6,439,088 | B1 * | 8/2002 | Eytchison et al. | 83/13 |
| 6,675,565 | B2 | 1/2004 | Appleyard | |
| 6,745,549 | B1 | 6/2004 | Taylor | |
| 6,862,871 | B2 | 3/2005 | Morabit | |
| 6,874,303 | B1 | 4/2005 | Yang | |
| 6,892,518 | B1 | 5/2005 | Bares | |
| 6,922,981 | B1 | 8/2005 | Tyree | |
| 7,043,872 | B2 | 5/2006 | Cheek, Jr. | |
| 7,107,745 | B2 * | 9/2006 | Dunda | 56/12.7 |
| 2007/0000227 | A1 | 1/2007 | Mazar et al. | |

* cited by examiner

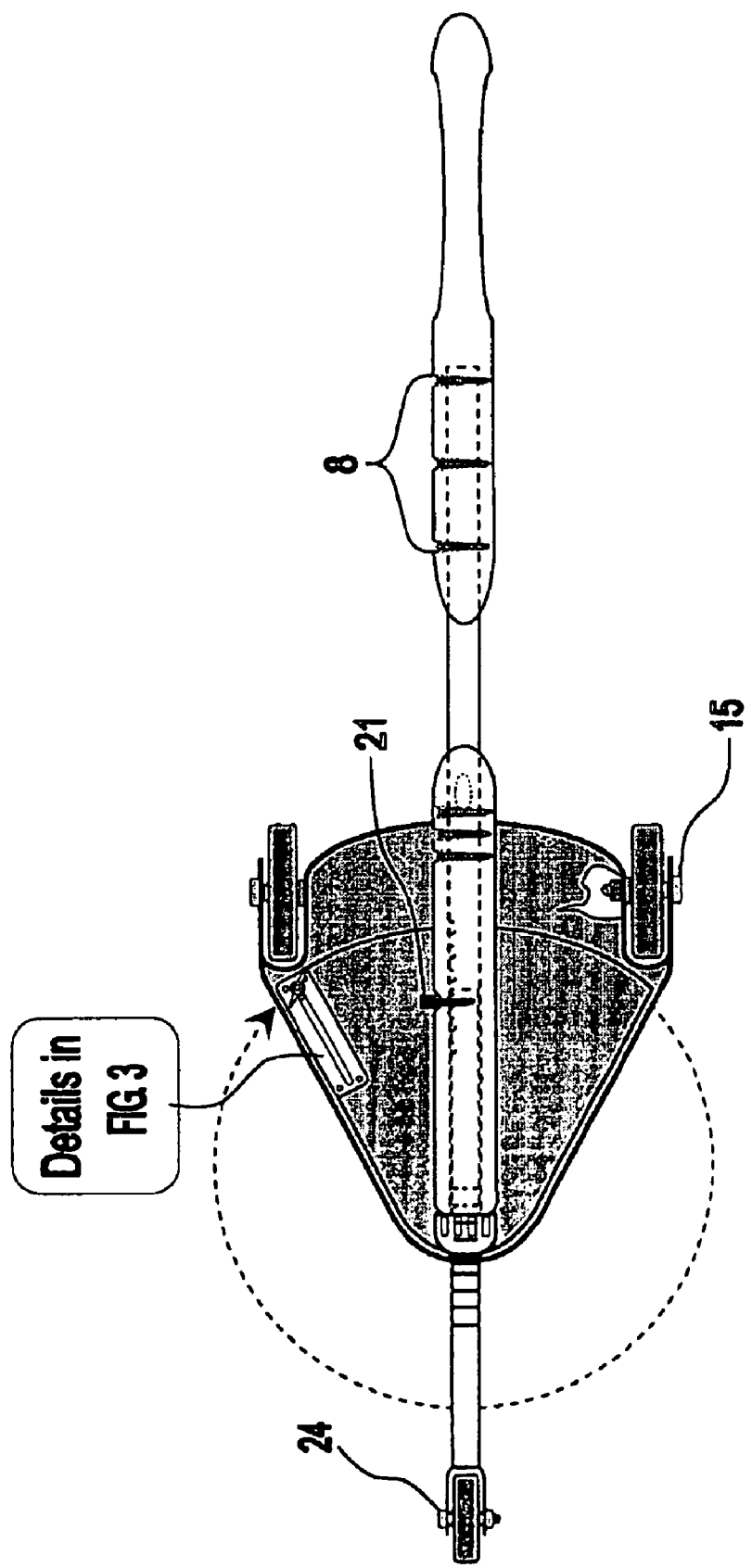

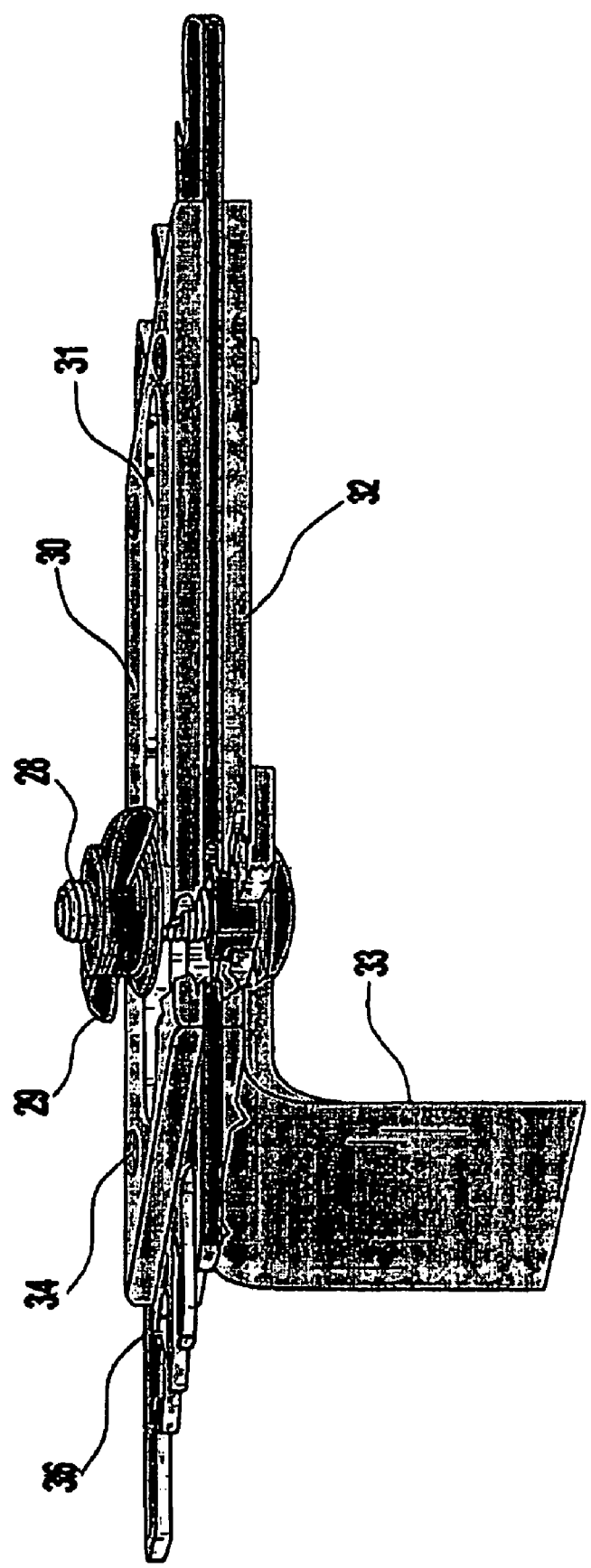

TRI-WHEELED MODULAR HOUSING TELESCOPIC GRASS TRIMMER

This Application Claims Priority To Provisional Application No. U.S. PTO 60/816,042 Jun. 22, 2006

BACKGROUND OF THE INVENTION

1. Field of the Invention

The present invention generally relates to a grass string trimmer, and more particularly directed to a new grass string or blade trimmer assembly having a combined modular tri-wheeled housing with an integrated telescopic adjustment feature for supporting its respective spinning device namely its electric or battery-driven motor, as well as the gasoline-driven engine, which rotatably powers the attached string or blade cutting element to cut grass. The foregoing apparatus is comprised of a pair of rear ground contact wheels, which are rotatably disposed in a parallel position and is spaced apart from one another on its respective mounting zone at the trailing edge corners of the said housing structure, and a front ground contact wheel mounted relatively perpendicular to the midpoint between the said two rear ground wheels extremities and is rotatably mounted on a fork affixed to the end tip of a projecting tubular telescopic shaft, which is detachably fitted into an embedded tubular receiving chamber within the said housing framework as an integral part thereof. Conversely, the shared effort of the foregoing wheels given that all are properly in place and engaging the ground, the new grass trimmer assembly consequently transforms the modality of its unified structure into a tri-wheeled carriage. Said receiving chamber is an elongated tubular form longitudinally embedded in a fixed position along the elongated upper section between the two married symmetrical halves of the housing from which an open-end portion of the receiving chamber protrudes therefrom and diagonally projects towards the ground, thus providing an entry into which said telescopic shaft is slidably adjoined and thereafter suspends the housing frontal elevation from the ground. Given that the rear ground wheels are engaging the ground, a vertical adjustment to the housing frontal elevation may be manually modified and mechanically locked therein at any point of desired selected position by repositioning the projection of the telescopic shaft from the receiving chamber through its connecting joint. Relative to this event, there is a rotating whipping segment of a string-cutting line that protrudes out of the spool, which is attached to the extended shaft of a driving motor, which is vertically mounted partway in the underside of the said housing. The rotational symmetry of said cutting line with respect to its cutting orientation is parallel and in consonant with the housing horizontal plane with its working norm position in common to the ground surface, and may be deflected instantaneously as a direct result from the telescopic shaft linear adjustment. It should be mentioned that the drawings within this context are representations to illustrate and facilitate the view of concepts and principles of the present invention and are not limited to the redesigning of future versions for other usage nor do they limit the originating and retrofitting of parts where it is indispensably essential pursuant to the integrity of its standard-making process as well as modernizing while it maintains its own particular identity inherent within the meaning and framework of this context. The preferred embodiment shown in FIG. 1 represents a new electric operated trimmer wherein the upper end portion of the receiving chamber adopts a hand lever in a cantilever fashion associated with an electric on/off switch and an electric cord connector socket. It is apparent that the method and merits underwhich the present invention system is utilized represents a new breakthrough in the field of trimming grasses, particularly where proficiency and precision cutting are taken as necessary factors to accomplish a certain task that is not achievable within the fundamentals and limitation of the current conventional types. In use, the new trimmer is manually rolled and maneuvered over the ground surface operably through its projecting hand lever.

2. Description of the Prior Art

Grass trimmers are in common use throughout the United States and many other countries today. A number of techniques have been explored and developed for quality improvement and efficiency on the grass trimmer, however, the findings set forth in the prior art have shown that no similar apparatus from the myriad of designs has captured the style of architecture nor teaches the advantages and mechanics of the present invention.

Known prior art includes:

| U.S. Pat. Nos.: | Inventors: | Dates: |
| --- | --- | --- |
| 6922981 B1 | Hillard Tyree | Aug. 2, 2005 |
| 6892518 B1 | Michael Bares | May 17, 2005 |
| 6874303 B1 | Chun Jeng Yang | Apr. 5, 2005 |
| 6862871 B2 | Vincent D. Morabit | Mar. 8, 2005 |
| 6745549 B1 | Joseph C. Taylor | Jun. 8, 2004 |
| 6675565 B2 | Richard Appleyard | Jan. 13, 2004 |
| 6363699 B1 | Tsan-Ching Wang | Apr. 2, 2002 |
| 6085503 | James C. Hutchinson | Jul. 11, 2000 |
| 6065275 | Stella S. Pope | May 23, 2000 |
| 6056067 | John W. Brown | May 2, 2000 |
| 6050069 | Charles L. Elenski | Apr. 18, 2000 |
| 6009694 | Larry Moore | Jan. 4, 2000 |
| 5970694 | Robert J. Knox, Jr. | Oct. 26, 1999 |
| 5970692 | Thomas E. Foster | Oct. 26, 1999 |
| 5884462 | Edward H. Gerber | Mar. 23, 1999 |
| Des.402433 | James R. Wells | Dec. 8, 1998 |
| Des.402297 | Peter L. Rappolt | Dec. 8, 1998 |
| 5836142 | Eugene E. Maxell | Nov. 17, 1998 |
| 5829236 | Jonathan D. Ballard | Nov. 3, 1998 |
| 5626006 | Stanley G. Fricke | May 6, 1997 |
| 5613354 | Thomas E. Foster | Mar. 25, 1997 |
| 5603205 | Thomas E. Foster | Feb. 18, 1997 |
| 5561969 | Floyd R. Sandy | Oct. 8, 1996 |
| 5484154 | Frank R. Ward | Jan. 16, 1996 |
| 5477665 | Lynda M. Stout | Dec. 26, 1995 |
| 5459985 | Leon G. Gedert | Oct. 24, 1995 |
| 5450715 | David C. Murray | Sep. 19, 1995 |
| 5408816 | Lucille L. Carter | Apr. 25, 1995 |
| 5317807 | Bobby L. Pulley | Jun. 7, 1994 |
| 5313770 | Odis B. Smothers | May 24, 1994 |
| 5279102 | Thomas E. Foster | Jan. 18, 1994 |
| 5222750 | A. Harlow Ellis | Jun. 29, 1993 |
| 5095687 | Robert G. Andrew | Mar. 17, 1992 |
| 5092112 | Rudy R. Buckendorf Jr. | Mar. 3, 1992 |
| 5048276 | Gary D. Miller | Sep. 17, 1991 |
| 4936886 | Ralph D. Quillen | Jun. 26, 1990 |
| 4922694 | Clesson E. Emoto | May 8, 1990 |
| 4891931 | Paul W. Holland | Jan. 9, 1990 |
| 4879869 | Rudy R. Buckendorf Jr. | Nov. 14, 1989 |
| 4873819 | Charles C. Shivers | Oct. 17, 1989 |
| 4845929 | Masami Kawasaki | Jun. 11, 1989 |
| 4829755 | Nora S. Nance | May 16, 1989 |
| 4756147 | Kenneth J. Savell | Jul. 12, 1988 |
| 4704849 | Zachary R. Gilbert | Nov. 10, 1987 |
| 4688376 | Donald E. Wolfe Sr. | Aug. 25, 1987 |
| 4587800 | Raul Jimenez | May 13, 1986 |
| 4531350 | Edward A. Huthmacher | Jul. 30, 1985 |
| 4411126 | Josep M. Lowry | Oct. 25, 1983 |
| 4442659 | Henry J. Enbusk | Apr. 17, 1984 |
| 4512143 | Raul Jimenez | Apr. 23, 1985 |
| 4389836 | Joseph M. Lowry | Jun. 28, 1983 |
| 4351143 | William R. Lessig | Sep. 28, 1882 |
| 4343139 | Joseph M. Lowry | Aug. 10, 1982 |
| 4341060 | Joseph M. Lowry | Jul. 27, 1982 |

-continued

| U.S. Pat. Nos.: | Inventors: | Dates: |
|---|---|---|
| 4182100 | Joseph D. Letter | Jan. 8, 1980 |
| 4077191 | Charles B. Pittinger Sr. | Mar. 7, 1978 |
| 4043101 | Fred H. Lahr | Aug. 23, 1977 |
| 4033098 | Garry J. Green | Jul. 5, 1977 |
| 4224784 | Lee A. Hansen | Sep. 30, 1980 |
| 1467212 | Michael J. Walsh | Sep. 4, 1923 |
| 498533 | Louis Clousing | May 30, 1893 |

In these respects, the distinction and merits of the present invention now known herein, presents the novelty of its making that substantially differentiates itself from the conventional trimmers in the prior art both in performance and design. In view of the foregoing disadvantages inherent in the known types of grass trimmer present in the prior art, the present invention will be more defined and comparably understood for its high level of superior distinction over similar trimmers in every aspect of its work performance, design and efficiency, which is further described hereinafter.

SUMMARY OF THE INVENTION

The subject grass trimmer is a manually operated compact tri-wheeled assembly having a segment of a rotating cutting element such as nylon string line or a blade type attachment rotatably driven by an onboard electric motor that can be powered by a conforming 120-volt alternating current from a common household source, rechargeable battery or a gasoline-driven engine, whichever is required for its certain design. The present invention is highly versatile and encompasses a wide range of usage in cutting grass in areas inaccessible to traditional trimming apparatus. It is the state-of-the-art achievement in both design and functionality since the inception of grass trimmers that employ a rotating nylon string-cutting element. Various styles of conventional grass trimmers in today's market and those currently used for both household and commercial purposes, shows the same typical functionality and handling characteristics, which are typically operated in an old traditional fashion either by a hand-held or rolling operation without a reliable means to ensure an accurate horizontal cutting pattern that equals the specifics and the ingenuity of the present invention. Obviously, the unique design of the present invention separates itself with a distinct profile of unparalleled style far beyond any finished of other similar grass trimming apparatuses. It is a flagship of grass trimmers that apparently demonstrates greater advantages and superior qualities in many categories regarding work performance, such as time efficiency, cutting accuracy, versatility and maneuverability than any current traditional types. The enjoyment of these benefits being offered by the present invention cannot be over-emphasized particularly in the adaptation of its unique new features, which are paramount to its fast and accurate operation in accomplishing tasks in the field of trimming grasses. One of the features that hi-lights its advantages over any similar conventional apparatus is the incorporation of a wheeled telescopic component integrated within the modular housing now known as one of its defining features—an icon that stands out with a mark of distinction among the multitude of current different styles and designs since the outset of a grass trimmer. In particular, the combination of telescopic feature and the incorporation of ground wheels are essential means that enhances the trimmer's handling capability into a broader functionality, and more especially on the merit of being mobile and instantly ready for cutting adjustment. Furthermore, the wheeled shaft member of said telescopic component is a detachable multifunctional constituent of the new grass trimmer for cutting adjustment, a means for maintaining the upright balance, as well as a prerequisite for its ground mobility in conjunction with the rear ground wheels. Conversely, the provision of the aforementioned wheels converts its modality into a tri-wheeled hand-driven carriage. As such, it enables the operator to tailor his/her preference in cutting at any point of desired height without having to add or remove any part from it. In light of the new trimmer's capability, an adjustment to a uniform height of the grass being cut can be precisely tailored as intended by changing the pitch of a rotating string-cutting line. To accomplish this goal, a longitudinal repositioning of a telescopic shaft member that features a quick process allows the operator to modify the linear adjustment through the connecting joint between the telescopic shaft and the receiving chamber to effect a change in the mechanical configuration aimed for the setting. In that standpoint, the measure of a shaft protrusion that extendably projects out of the receiving chamber is an intermediary point at which the wheel base is modified, which consequently alters the housing frontal elevation in unison with the pitch cutting orientation of the string-cutting line, at which point such eventual change in configuration eventually changes the height level of the cutting line segment. In this instant, the resultant of a change being made on the current configuration tilts the housing upright balance to a drooping position, whereby the angle of deflection of the rotating string-cutting segment is drawn in unison and causes the cutting pattern to change into a new directed path. Moreover, the scale marking in a series of bar intervals is provided over the exposed portion of the telescopic shaft to serve as an immediate reference guide to the current cutting position as well as for adjustment purposes. In view of its perspective structural framework in which the housing is the main core of the entire system as illustrated in FIG. 1, apparently shows a modular part thereof on which all the unified intrinsic parts and components are solely embodied upon and formed into a self-contained unit. With respect to the threshold of adjustment, an elongated tubular receiving chamber that telescopingly isolate and secures the telescopic shaft, is diagonally embedded between the married elongated two-piece symmetrical halves on the upper section of the modular housing, whereby said shaft is harmoniously fitted partway into the receiving chamber and locked therein with a collar compression nut or a detent locking device, which screwably engages over the thread of a slotted overhang tip end of the modular housing, which radially constricts the slotted open end of said receiving chamber circumferentially over the immediate surface of said shaft to retain position. As an attribute to its ground mobility, the front ground wheel, which is rotatably mounted on a fork affixed to the lower free end of said shaft is provided, likewise, a pair of rear ground wheels, which are rotatably mounted on its respective mounting rack at the trailing edge corners of the subject housing protective skirt. Conversely, given that all of the foregoing wheels are properly in place, said modular housing mechanically transforms its modality into a manual tri-wheeled carriage upon which the built-in electric-driven motor of the preferred embodiment in FIG. 1 is being carried and transported while spinning the string-cutting dispensing spool, which is firmly attached to the extended shank of the motor shaft. Said spool stores the preferred wound supply of nylon string-cutting line with the segment of which protrudes outwardly from the side opening of its casing eyelet and rotate on its path in consonant with the spool axis of rotation, and the tail end of which releases a snapping action exerted from inertia out of centrifugal force generated by the spinning motion of the spool. Furthermore, in reference to the ground surface, the path of rotation of said cutting segment pitches as a slave to the horizontal plane of the subject housing. Relative to the wheel base, a longitudinal positioning rendered upon the telescopic shaft in FIG. 2, operably link as a key factor affecting both of the housing angle of depression and elevation to cause the mode of changes in the cutting orientation. It must be mentioned that the foregoing functionality within the mechanics of the present invention including those that are set forth hereinafter is not limited to the usage attributed from the preferred embodiment as being presented herein and the details of construction relevant to its purpose, nor the arrangement of components set forth in the following description and illustrated in the drawings, where the present invention establishes its own identity with a wheeled housing having an integrated multi-purpose wheeled telescopic shaft as a constituent part thereof as intended for adjustment and mobility of the subject apparatus. The present invention is capable of other embodiments that can be carried out, utilized, and paraphrased for various applications. Those that are skilled in the art will appreciate the conception, upon which the presentation of the invention is disclosed herein, may readily be utilized as a basis to replicate other versions or structures to adopt the concept of the present invention. In light of its vast application, mechanics of functionality and its variability as being described herein, the system in pursuit of its novelty does not depart from the spirit and scope of the present invention. As such, it is therefore the description outlined herein, notwithstanding, whether it is perceived as implied or specific, however, its intent is to establish an explicit guidance and clarity of teaching. It is an object of the present invention to provide a new grass trimmer having a telescopic adjustment mechanism embodied within its modular housing as an integral constituent to its functional design for cutting grass, and more specifically for use as a controlling mechanism in gauging specific and uniform cutting height tailored to suit the operator's objective, and thus a means for having an instant state of readiness for adjustment at the work site and maneuverability with ease. It is also an object of the present invention to provide a new grass trimmer with locking devices for retaining the preset cutting position made through adjustment. One of which is a collar compression nut or a detent locking device, which progressively constricts the slotted overhang end portion of the modular housing that concentrically encircles the slotted end opening of the receiving chamber, which is directly abutting with the surrounding outer surface of the telescopic tubular shaft. Another locking device is a detent pin that pierces detachably into the lateral guide hole that intersect perpendicularly across the receiving chamber wall and through one of the plurality of linear incremental detent holes spaced in a series interval along the wall of said shaft. It is a further object of the present invention that a telescopic shaft component of a new grass trimmer is a removable attachment formed from an elongated tubular material having a front ground wheel affixed to its one end and the opposite end of which is detachably and snugly fitted partway into a matching receiving chamber and locked therein to maintain position. Said shaft is fully retractable to bottom freely into the receiving chamber and secured therein as an option in disengaging the front wheel from the ground in an object to immobilize its service. As such, this new grass trimmer can be operably rolled strictly on its rear ground wheels or manually lifted as a variation of its intended use to accomplish a certain task. Another method to cease the front wheel service is by detaching the entire telescopic shaft component completely out of the receiving chamber. It is another object of the present invention to provide a new grass trimmer with a modular housing structure designed to adopt and permit a telescopic shaft to function dually as an independent wheel support, likewise, an extendable suspension for stabilizing the upright balance of the carriage. It is yet another object of the present invention to provide an alternate version in mounting of the rear ground wheels, which will employ a separate bracket retrofit in anticipation of any future redesigning of the structure thereof without departing from the ingenuity and scope of the present invention. Still another object of the present invention is that both front and rear ground wheels of the new grass trimmer are constituent parts of its functional design attributing to its ground mobility. Even still another object of the present invention is to provide a new grass trimmer with a symmetrically formed hand lever to provide control for maneuverability. Said lever is steadfastly fastened about the extended upper end of the receiving chamber, and is associated with an on/off switching device employed for running the onboard motor. Still another object of the present invention involves the protective skirt that extends rearwardly of modular housing, which is provided with a fairing interface that enclaves the surrounding edges of the lower extremity of the housing structure, whereafter it forms into a unified wheeled cradle thereof upon which the said housing is seated. It is also an object of the present invention to provide a new grass trimmer with a variable string snipper subassembly as a means for predetermining the span of cutting area tailored to suit the operator's desire. Said snipper employs a pair of symmetrical plates having an elongated slot at the centerpoint of both plane surfaces. One of which is a base plate, which is laid and firmly fastened atop the outer region of the protective skirt of the modular housing by either rivets or machine screws through across the protective skirt and into a symmetrical back plate, which interfaces directly on the opposite side of the sandwiched protective skirt. With both plates being clasped together, the conforming slot of which is replicated on said protective skirt and thereafter a single linear channel is formed and utilized as guide to the positioning of the cutting blade, which is vertically suspended and slave to the carriage bolt that can be transversely positioned in random along the plate slot and locked therein with a wingnut. Said snipper is devised for cutting off the excess length of a string-cutting segment by which the sharp edge of the vertical planar of the blade confronts against the rotating segment of the cutting line and cut to a predetermined length to establish and maintain its cutting radius consistent with the setting. In reference to FIG. 2, the usage of which is briefly exemplified and simulates the mechanics of its operation, whereby the concentric pattern of the rotating line as illustrated is achieved with a diametric span between 12 and 17 inches of cutting path.

BRIEF DESCRIPTION OF THE DRAWINGS

The present invention and its concept will be better understood other than those set forth above and its purpose will become more apparent when consideration is given to the following detailed description thereof.

FIG. 2 is the top perspective view of the preferred embodiment showing the illustrative arrangement as well as location of both front and rear wheels connectivity in conjunction with the telescopic shaft, likewise, a snipper subassembly of the present invention.

FIG. 3 is the side elevational illustration showing a cross-sectional view section of a variable snipper subassembly of the present invention.

DETAILED DESCRIPTION OF THE PREFERRED EMBODIMENT

Figure 1:
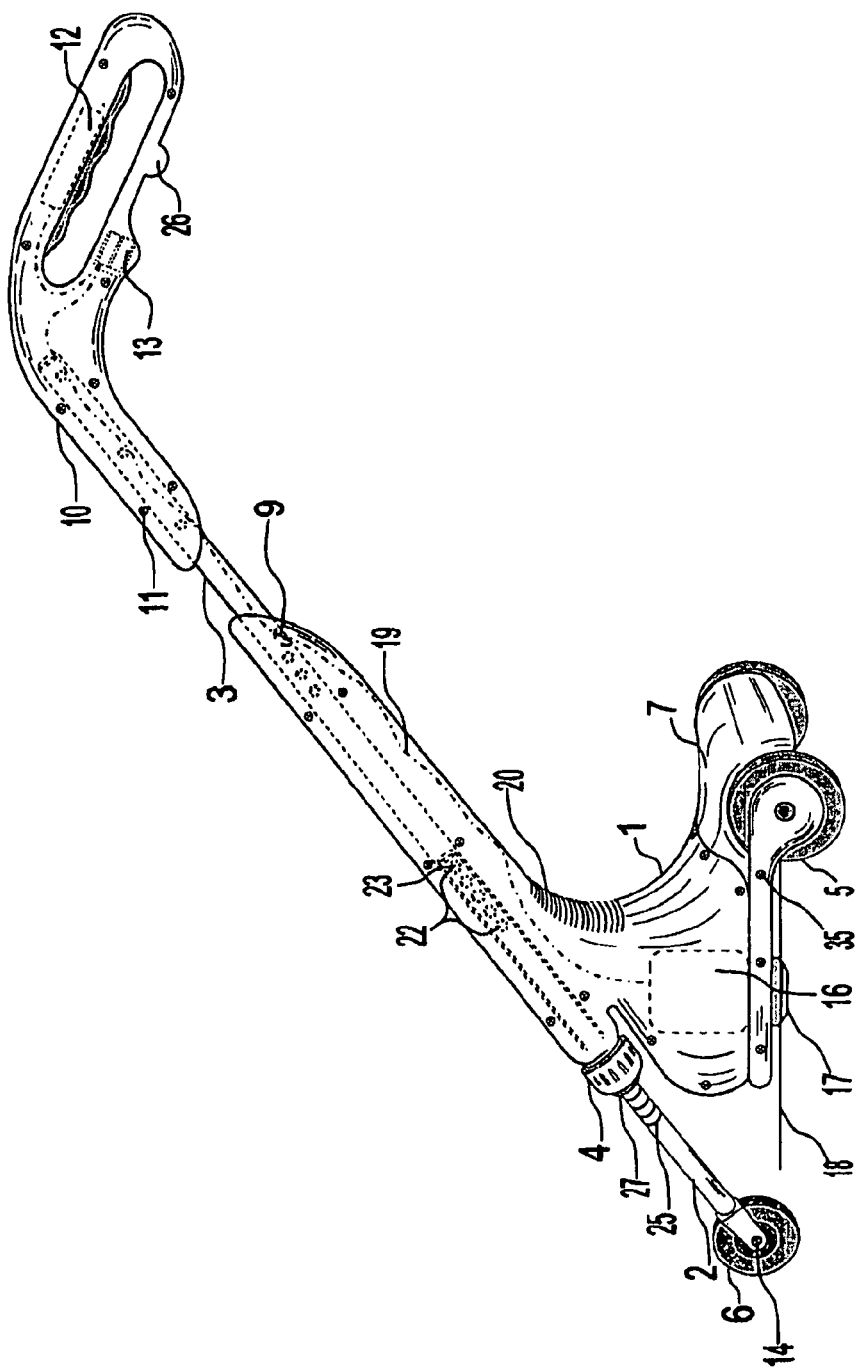
FIG. 1 is a perspective view of the preferred embodiment showing the telescopic shaft and wheels attachment to the modular housing embodying the principles and concepts of the present invention.

With reference now to the drawings FIG. 1 through FIG. 3 thereof, this new grass wheeled trimmer assembly embodying the concepts and principles of the present invention described herein are designated in numeric references.

As shown in FIG. 1, the modular housing 1 of preferably plastic material is comprised of two symmetrical conjoint casing halves upon which all constituent parts that make up this new grass wheeled trimmer are embodied upon and formed into a version of a tri-wheeled carriage. Said housing is provided with louvers 20 having a multiplicity of parallel slots opening to permit the escape of heat generated from the motor. A portion of receiving chamber 3 from a preferably elongated tubular rigid aluminum material of about one inch (1.000) in outside diameter with a wall thickness of about sixty two thousandth of an inch (0.062) is longitudinally embedded along the elongated upper region of said housing structure and fastened therein in a fixed position with a substantial amount of deep threaded spiral screws 11 and anti-spin screws 8 as shown both in FIG. 1 and FIG. 2 respectively, to prevent it from inadvertent axial rotation. The receiving chamber 3 constitutes a dual function within the system where both ends are utilized for different purposes. One of which serves as an isolating cylinder into which a detachable telescopic shaft 2 from an elongated tubular rigid material, preferably aluminum, is closely fitted partway at a desired projection and locked therein with a collar compression nut or a detent locking device 4 that engages over the threaded finger collet on the overhang section of modular housing 1, whereby a direct constricting pressure is radially initiated by collar compression nut or a detent locking device 4, hence progressively transfer an axial mechanical effort into a domino effect over both the tapered split sleeve 27 that encircles the telescopic shaft 2 and the plurality of slotted end opening of the receiving chamber 3 which simultaneously exert an axial pressure circumferentially of the telescopic shaft to stabilize the configured longitudinal adjoining position. A manual detent pin 21 as shown in FIG. 2 is provided as an interlocking device to ensure firmness and stability of telescopic shaft 2 projection from the receiving chamber and prevents it from an axial rotation, whereby the said pin does perpendicularly intersect across into a guide hole 23 of the receiving chamber 3 and through one of the selected holes among the plurality of detent holes 22, which are equally spaced at approximately one third of an inch (0.333) interval in a linear distribution closest to the upper end section of telescopic shaft 2. For adjustment purposes, a reference guide that indicates the vertical position of the frontal elevation of the modular housing 1 as well as the corresponding angle of incidence and height of the cutting line, a measuring scale 25 having a plurality of bar marking in equal increment, is provided over the said telescopic shaft either by inscription or lithographed band label, which is placed on the midway section at the proximity of collar compression nut or a detent locking device 4 within a given norm of adjustment range. Another instant function of the receiving chamber 3 is to provide a mounting zone upon which a hand lever 10 of a two-piece symmetrical halves from a hybrid plastic material, is adopted over its extended upper end, and axially fastened together thereto with a substantial amount of anti-spin screw 8 as shown in FIG. 2, which pierces perpendicularly through each respective pilot hole across the interposed receiving chamber 3, which after said symmetrical halves are clasped together into a unit and prevented from an axial rotation. Moreover, as shown in FIG. 1, the telescopic shaft 2 incorporates a front ground wheel 6 of about three inches in diameter formed from a light plastic or rubber material. Said wheel is rotatably suspended about its axle bolt and nut 24 as shown in FIG. 2, with which is mounted on a mounting fork 14 as shown in FIG. 1, which is affixed to the front end of said shaft preferably by welding. Likewise, a pair of rear ground wheels 5 attachment of about five inches in diameter formed from a light plastic or rubber material are adopted with the modular housing 1 as a direct means for its ground mobility in conjunction with the foregoing front wheel set forth herein to form a tri-wheeled carriage for the new grass wheeled trimmer. Said rear ground wheels are suspended individually about the axle bolt and nut 15 with which they are mounted on each respective mounting rack at the trailing edge corners of the said housing. Furthermore, it cannot be over-emphasized that the wheeled telescopic shaft 2 is a multi-functional constituent that primarily supports and maintains the upright balance of the entire structure, and in particular, it is devised to tiltably govern the frontal elevation of the modular housing 1 as a baseline that justifies the angle of deflection of the cutting line orientation. The modular structure of said housing is comprised of a preformed two-piece symmetrical halves from a strong resilient hybrid plastic or a rubber-like material, which are being clasped together as mentioned earlier. From an engineering point of view however, the structural finished version of which may incorporate an option in which a section of an extended fairing interface 7 formed from a preformed structural framework, as shown in FIG. 1 and FIG. 3, is fastened to the lower section of said modular housing with a substantial amount of screws 35 as a frame support thereof and conversely referred to as a unified wheeled cradle. As such, the co-existence of said fairing interface is being employed as a reinforcement member that solidifies the integrity of the whole structure to withstand high vibration and inadvertent stress that develops due to the protuberance and undulated terrain surfaces during operation as well as compression load and vertical impact. Furthermore, said fairing interface enclaves the surrounding boundaries of the housing lower extremity and defines the regional contour thereof that adheres to the functional design of the housing, whereby the rear section of which is being employed as a mounting zone for the rear ground wheels 5, which are disposed equidistant from the center point of the onboard motor set forth herein, in such a manner that the front wheel alignment does intersect relatively perpendicular to the midpoint of the centerline between the two rear ground wheels outer extremities. With the hand lever 10 in place and given that all foregoing wheels are engaging the ground, consequently, the resultant upon embodying of all the foregoing constituent parts with the said modular housing in all respects, transforms the mechanics of its making into a manually driven tri-wheeled carriage. The system adopts the previously mentioned onboard electric motor 16 and permanently disposed into the modular housing 1 in accord to the specifics of its functional configuration and powered by a 120-Volt AC for the preferred embodiment, which can be connectively run from a household source via electric cord, or a compliance motor operably run by a suitable rechargeable onboard battery in conformity with the requirement for a certain version, or by a conforming alternate "compliance gasoline-driven engine" designed for its certain model. The foregoing respective motor is firmly disposed partway into the underside of the housing and secured therein vertically perpendicular to the horizontal plane of said housing structure in common to the ground surface. In conjunction with the aforementioned spinning devices, they are the system's requisite means for spinning the attached feed spool 17, which stores a preferably wound nylon string-cutting line and releases therefrom a portion of which into a rotating segment of a cutting line 18, thus rotatably powers the pliable cutting blade attachment as an alternate thereof, whichever is employed pursuant to its design. With respect to the use of a string element for cutting, the segment of which automatically protrudes from the eyelet of said feed spool as being drawn out by centrifugal force that takes place during rotation and harmoniously rotates in unison and in consonant with the motor axis of rotation. A hand lever 10, which is mounted on the upper end of receiving chamber 3, is comprised of two symmetrical halves and fastened thereon in a fixed position with a substantial amount of deep-threaded spiral screws 11 and anti-spin screws 8 as shown in FIG. 1 and FIG. 2 respectively to prevent it from an axial rotation. Generally, the art form of said hand lever being attributed to the new tri-wheeled grass string trimmer displays an architecture in a cantilever fashion. A suspension hook 26 that extends from the underside of the hand lever 10 provides a hang support on which the external electric power cord is suspended upon during connection with the male power input socket 13. The placement of the connecting wire 19 within the system is hermetically laid out inside the housing. Hence, FIG. 1 illustrates the motor wires that pass through along the void spaces and into the access hole 9 of the receiving chamber 3 and thereafter formed to a loop interconnection between the on/off switch 12 and the external male input socket 13. A feature of a variable string snipper subassembly as illustrated in FIG. 2 is adopted into the system to which the new trimmer enhances its versatility of usage, and more particularly for use by an operator in presetting the span of desired cutting path. Said subassembly is disposed atop the right outer section of the protective skirt and adjacent to the forward side of the right rear wheel, wherein the symmetrical base plate 30 and backplate 32, as shown in FIG. 3, from a preferably preformed aluminum material, both having a uniform elongated slot along the center line of both plane surfaces, are interfacing opposite of each other and clasped together by a preferably set of rivets 34 over the interposed surface of the protective skirt 36 in which the elongated matching slots of both said base and back plates, whereby now serving as a template, is correspondingly replicated upon the said protective skirt, which after collectively formed into a single elongated vertical channel 31 into which the carriage bolt 28 that suspends and mechanically interlocks the snipper blade 33 on its interfacing plane, is disposed vertically across in a manner which said carriage bolt is afforded with freedom of transversal access longitudinally along the said channel for spotting at any point of desired location and locked therein with a wing-nut 29 to a static position. A snipper blade 33, which is formed in an "L" shape fashion transverses along the longitudinal path of channel 31 as slave to the carriage bolt 28, and the vertical planar blade of which is positioned relatively perpendicular to the outer concentric path of the string-cutting segment rotation. In an inference that the snipper blade 33 position has been fixably selected during operation, the sharp edge of its vertical planar confronts against the tip end portion of the string-cutting segment within its axis of rotation and cuts to the length upon impact commensurate with the corresponding distant radius to the blade, whereby the circular span of the cutting line segment is achieved in conformity with the setting.

What is claimed is:

1. A grass trimmer comprising:
   a) a carriage comprising
      1) a horizontal base comprising a front and a rear, said rear of the horizontal base comprising ground contact wheels laterally disposed in parallel;
      2) a housing core, said housing core extending obliquely from the front of the base upward and outward past the rear of the base;
      3) a housing, said housing extending upward from the horizontal base so as to form an integrated unit with the housing core; and
      4) a hand lever, said hand lever attached to or formed from the upper end of the housing core;
   b) an elongated receiving chamber affixed within the length of the housing core;
   c) a telescopic shaft, said telescopic shaft slidably fitted into and integrated with the receiving chamber;
   d) a front ground contact wheel, said front ground contact wheel being connected to the telescopic shaft;
   e) a motor, said motor situated within the housing, and said motor comprising a shaft;
   f) a cutting element, said cutting element attached to the shaft and driven by the motor, and said cutting element being positioned in a plane parallel to a plane defined by the horizontal base; and
   g) a power source.

2. The grass trimmer of claim 1, wherein the cutting element comprises a spool and string, said string being wound around said spool such that one end of said string trails freely.

3. The grass trimmer of claim 2, wherein the spool comprises a casing eyelet through which the end of the string protrudes.

4. The grass trimmer of claim 1, wherein the cutting element comprises at least one blade.

5. The grass trimmer of claim 1, further comprising a fairing interface, said fairing interface being connected to the housing.

6. The grass trimmer of claim 4, wherein the fairing interface forms a protective skirt on the underside of the housing.

7. The grass trimmer of claim 1, further comprising a variable snipper sub-assembly.

8. The grass trimmer of claim 1, wherein the power supply is selected from the group consisting of battery, AC and fuel engine.

9. The grass trimmer of claim 1, wherein the hand lever further comprises a suspension hook.

10. The grass trimmer of claim 1, wherein the hand lever further comprises a switching device.

11. The grass trimmer of claim 8, wherein the power supply is AC and the hand lever further comprises a power input socket.

12. The grass trimmer of claim 1, wherein the housing further comprises louvers.

13. The grass trimmer of claim 1, wherein the front ground contact wheel is attached to the telescopic shaft via fork mount.

14. The grass trimmer of claim 1, further comprising a locking device attached to the lower end of the receiving chamber for immobilizing the telescopic shaft.

15. The grass trimmer of claim 1, further comprising a tapered split sleeve disposed between the locking device and the telescopic shaft.

16. The grass trimmer of claim 8, wherein the power supply is AC and connecting wires are disposed within the housing core and housing from the socket to the motor.

17. A grass trimmer comprising a wheeled carriage, a motorized cutting element situated in a housing unit fitted to said carriage, and an integrated hand lever, the improvements comprising the cutting element being situated between front and rear wheels so as to render it unobstructed on each side, and the integrated hand lever being connected to the front wheel via a telescopic shaft so as to maintain the cutting element relatively parallel to the underside of the carriage as it is raised and lowered via adjustment to the telescopic shaft.

* * * * *